United States Patent [19]

Tsukahara

[11] Patent Number: 5,150,139
[45] Date of Patent: Sep. 22, 1992

[54] ELECTRIC CAMERA EQUIPPED WITH DATA IMPRINTING DEVICE

[75] Inventor: Daiki Tsukahara, Hiratsuka, Japan

[73] Assignee: Nikon Corporation, Tokyo, Japan

[21] Appl. No.: 631,450

[22] Filed: Dec. 21, 1990

[30] Foreign Application Priority Data

Dec. 29, 1989 [JP] Japan .................. 1-344594

[51] Int. Cl.$^5$ ............................................. G03S 17/24
[52] U.S. Cl. ................................................... 354/106
[58] Field of Search ............................ 354/105, 106

[56] References Cited

U.S. PATENT DOCUMENTS

| | | | |
|---|---|---|---|
| 4,198,146 | 4/1980 | Taguchi et al. | 354/106 |
| 4,825,233 | 4/1989 | Kanai et al. | 354/106 |
| 4,958,174 | 9/1990 | Goto et al. | 354/106 |

FOREIGN PATENT DOCUMENTS

1-246533  2/1989  Japan .
1-315726  12/1989  Japan .

Primary Examiner—Michael L. Gellner
Attorney, Agent, or Firm—Shapiro and Shapiro

[57] ABSTRACT

An electric camera capable of imprinting data to an exposure frame of film has a first imprint mode changing switch and a second imprint mode changing switch. The first switch is operated successively to select a first imprint mode and a first non-imprint mode. The second switch is operated successively to select a second imprint mode and a second non-imprint mode. When the first switch selects the first non-imprint mode, the second non-imprint mode is automatically effected.

6 Claims, 12 Drawing Sheets

ELECTRIC CAMERA EQUIPPED WITH DATA IMPRINTING DEVICE

BACKGROUND OF THE INVENTION

1. Field of the Invention

The present invention relates to an electric camera equipped with a data imprinting device operating for reading year, month, day, hour and minute data from an electronic clock and imprinting to a film.

2. Related Background Art

A prior art camera of this kind is disclosed in Japanese Patent Application Laid-open No. 1-315726 (counterpart of U.S. Ser. No. 582,784 filed Sep. 14, 1990). This camera is equipped with an imprinting device capable of imprinting plural digit numeric values (6 digits) collectively. According to the imprinting device there are four options, namely, year/month/day mode, hour/minute mode, year/month/day+hour/minute mode, no imprint mode, and each mode is changed cyclically whenever a change operation is performed. The year/month/day mode is that of imprinting year/month/day data, and the hour/minute mode is that of imprinting hour/minute data. Each printing mode effects imprinting one time only between an exposure completion and a film winding. The year/month/day+hour/minute mode is that of imprinting the year/month/day data and the hour/minute data to the same frame successively. The year/month/day data is first imprinted at the point in time between an exposure completion and a film winding, and after winding a film by 1/n frames, the hour/minute data is imprinted. The film is then wound thereafter.

The prior art camera comprises an array only in the order of year, month and day for imprinting the year/month/day data. However, in consideration of a preferable construction in which arrays of month, day, year, and day, month, year will be realized, a month/day/year mode, day/month/year mode, month/day/year+hour/minute mode, day/month/year+hour/minute mode will be added to the aforementioned four modes, and a change operation must be applied a maximum of seven times for selecting a desired mode. Thus operation efficiency deteriorates sharply.

SUMMARY OF THE INVENTION

An object of the present invention is to provide a camera with improved ability to select a desired mode from among a multiplicity of imprint modes.

To attain the aforementioned object, the present invention comprises providing two imprint mode changing means, one of which is provided to select a first data imprint mode for imprinting first data (year/month/day data, month/day/year data, or day/month/year data, for example), and a first no imprint mode for not imprinting the first data, and the other of which is provided to select a second data imprint mode for imprinting second data (hour/minute data, for example) in addition to the first data, and a second no imprint mode for not imprinting the second data.

Further, the construction is such that by selecting the first no imprint mode on the first imprint mode changing means, the second no imprint mode is obtainable automatically without operating the second imprint mode changing means.

The construction being as mentioned above, a desired imprint mode can be selected quickly, and both the first and second no imprint modes can be set simply by operating the first imprint mode changing means.

DESCRIPTION OF THE PREFERRED EMBODIMENTS

Figure 1:
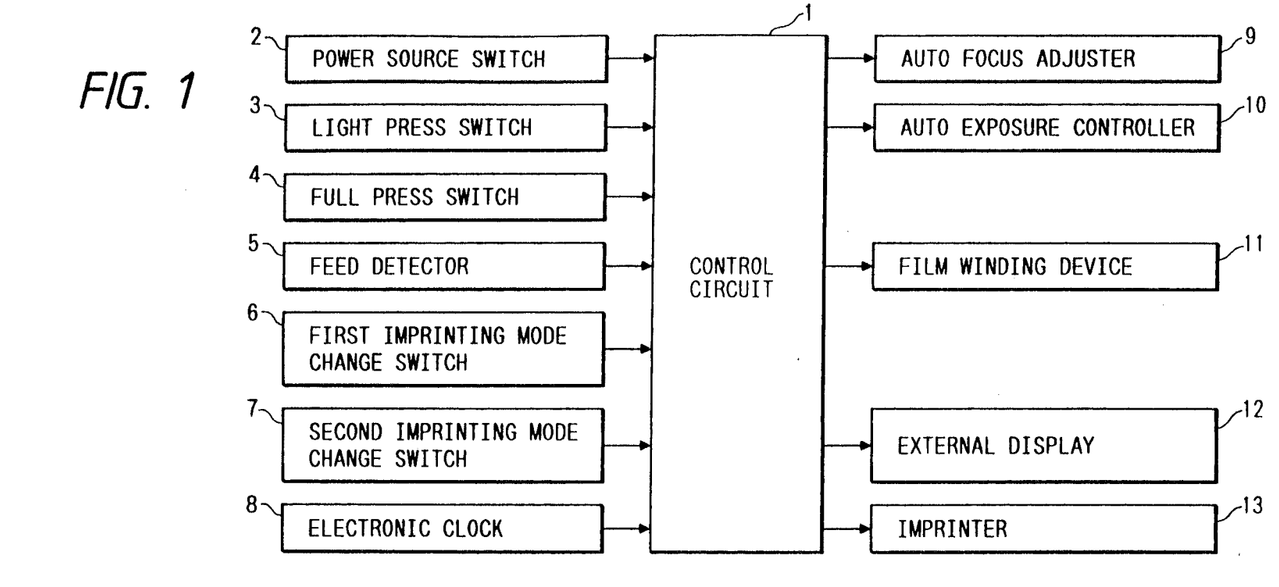
FIG. 1 is a block diagram representing one preferred embodiment of the present invention.

FIG. 1 is a block diagram representing an electric camera in one preferred embodiment of the present invention.

In the drawing, a control circuit 1 including a microcomputer controls operation of the present embodiment. A power source switch 2, a light press switch 3, a full press switch 4, a feed detector 5, a first imprinting mode change switch 6, a second imprinting mode change switch 7, an electronic clock 8, an autofocus adjuster 9, an auto exposure controller 10, a film winding device 11, an external display 12, and an imprinter 13 are connected to the control circuit 1.

The power source switch 2 is movable between an on position and an off position by applying an operation thereto, and is a slide switch retained at a position when the operation is released after the switch is brought to either position.

The light press switch 3 is turned on by depressing a shutter button (not indicated) deeper than a first stroke.

The full press switch 4 is turned on by depressing the shutter button deeper than a second stroke which is deeper than the first stroke.

The feed detector 5 is a device for detecting a feed amount of film coming from the film winding device 11 as described later. The detector 5 may be a well-known construction comprising a sprocket driven by engaging perforations of a film and a detector for detecting its rotational frequency, or a well-known construction of a detector detecting photoelectrically and counting the number of passing perforations. The first imprinting mode change switch 6 is turned on only when a press operation is applied, and first imprint modes (year/-month/day mode, month/day/year mode, day/-month/year mode, day/hour/minute mode, first no imprint mode) are changed cyclically whenever it is turned on.

The second imprinting mode change switch 7 is turned on only when a press operation is applied, and a second imprint mode (whether or not to add hour/minute mode) is changed cyclically whenever it is turned on.

The electronic clock 8 is a well-known one including a crystal oscillator, etc., outputting data indicating the present year, month, day, hour and minute moment by moment. The data are selected by the control circuit 1 according to a set imprint mode and sent to the external display 12 and the imprinter 13, which will be described later. The control circuit 1 latches the data to inhibit a change as time passes.

The autofocus adjuster 9 includes a range finder, and drives a camera lens (not indicated) according to the obtained result to focus on a subject.

The auto exposure controller 10 includes a photometer, and controls a diaphragm and a shutter according to the obtained result, thereby obtaining an appropriate exposure.

The film winding device 11 includes a motor, and winds and rewinds a film.

The external display 12 includes a reflective liquid crystal display element, and displays data sent by the control circuit 1, such as data from the electronic clock 8 and the like, externally on the liquid crystal display element.

The imprinter 13 includes a transmissive liquid crystal display element and a light source for illuminating it, displays data sent by the control circuit 1, such as data from the electronic clock 8 and the like, on the liquid crystal display element, and imprints the displayed data to a film when the light source lights up according to photography.

Figure 2:
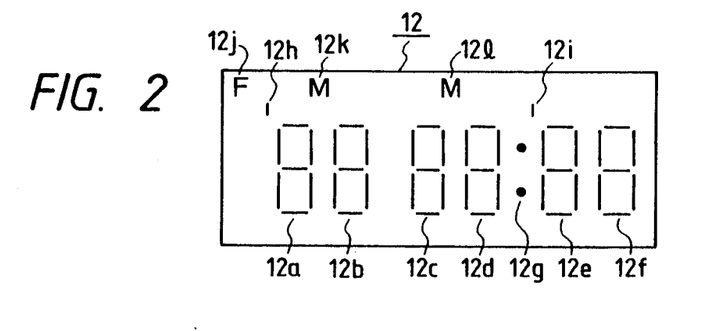
FIG. 2 is a plan view showing an external display of the embodiment.

FIG. 2 is a plan view showing the external display 12. In the drawing, all display segments are visible. Six-digit seven segments 12a to 12f display both year/-month/day and hour/minute data. The year/month/-day data is displayed in various selected arrays. Hour data may be displayed on a pair of seven segments 12c, 12d. Minute data may be displayed on a pair of seven segments 12e, 12f. A colon segment 12g for separating hour and minute is provided between the seven segments 12d and 12e. Year data may be displayed on a pair of seven segments 12a, 12b and a pair of 12e, 12f. Quotation mark segments 12h, 12i for displaying the year data are provided leftward over the seven segments 12a, 12e respectively. Month data may be displayed on a pair of seven segments 12a, 12b, and a pair of 12c, 12d. M segments 12k, 12l for displaying the month data are provided rightward over the seven segments 12a and 12c respectively.

The imprinter 13 has segments corresponding to the seven segments 12a to 12i of the external display 12, and is capable of imprinting images obtained thereby to a film.

Figure 3:
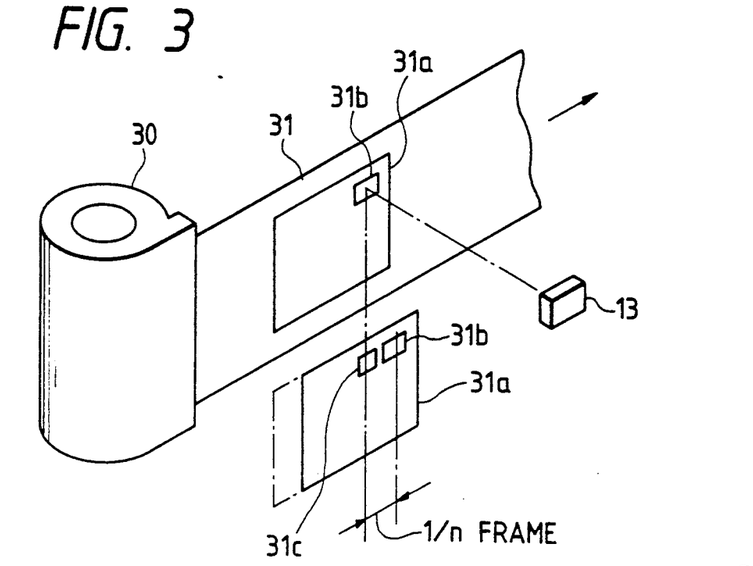
FIG. 3 is a perspective view indicating a case where the embodiment is employed on a camera loaded with a cartridge having film fed in the forward direction.

FIG. 3 indicates a data imprinting method on a camera when a film cartridge 30 is loaded for film feeding in the forward direction, that is, viewed from behind the camera, a cartridge is disposed on the left side, and a film spool is disposed on the right side, thus film 31 being wound from left to right. The imprinter 13 is disposed on a back cover of the camera, and is opposite to a first imprinting domain 31b of the upper right corner of an exposure frame 31a brought to an exposure position. When imprinting is performed one time, namely, in a second no imprint mode wherein first data (any one of year/month/day data, month/day/year data, day/month/year data) will be imprinted, but second data (hour/minute data) will not be imprinted (hereinafter called "single imprint mode"), winding of the film 31 is started immediately after the first data selected by the first imprinting mode change switch 6 is imprinted to the first imprinting domain 31b, and the next frame is brought to the exposure position. When imprinting is carried out two times, namely, in a mode to imprint hour/minute data or the second data to the same frame together with the first data (hereinafter called "two times imprint mode"), the film is wound by 1/n frames (⅓ frames, for example) only, as indicated below the film 31, after the first data is imprinted to the first imprinting domain 31b, and hour/minute data as the second data is imprinted to a second imprinting domain 31c positioned on the left side of the first imprinting domain 31b.

Figure 4A:
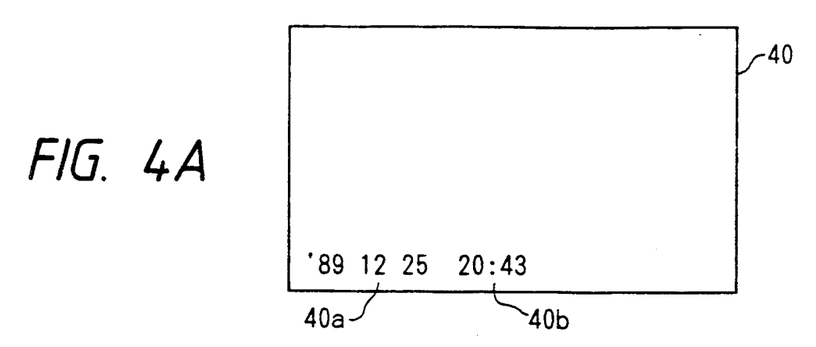
FIGS. 4A to 4G are illustrations showing a result of each data imprinting when film is fed in the forward direction.
Figure 4B:
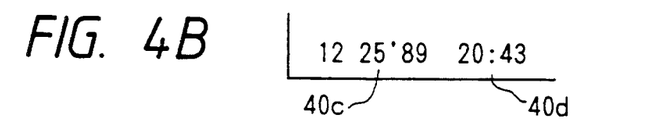
Figure 4C:
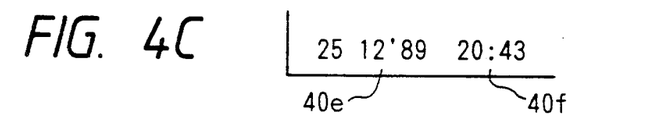

Prints obtainable from imprinting data with a cartridge loaded for film feeding in the forward direction, as in FIG. 3, are shown in FIGS. 4A to 4G. FIGS. 4A to 4C indicate a print result of the two times imprint mode for imprinting both the first and second data to the same frame together. The first data imprinted in the first imprinting domain 31b of FIG. 3 is a year/month/-day data array 40a ("89 12 25" representing Dec. 25, 1989) positioned at the lower left corner of a print 40 of FIG. 4A, and the second data imprinted in the second imprinting domain 31c of FIG. 3 is an hour/minute data array 40b ("20:43" representing 20 hours and 43 minutes) positioned on the right side of the year/month/-day data array 40a. That is, FIG. 4A indicates a result of the two times imprint mode (two times imprint mode in the year/month/day mode or two times imprint mode in the day/hour/minute mode) for imprinting the year/-month/day data array and the hour/minute data array successively. FIG. 4B indicates a result of the two times imprint mode (two times imprint mode in the month-/day/year mode) for imprinting a month/day/year data array 40c and an hour/minute data array 40d successively, and FIG. 4C indicates a result of the two times imprint mode (two times imprint mode in the day/-month/year mode) for imprinting a day/month/year data array 40e and an hour/minute data array 40f successively.

Figure 4D:
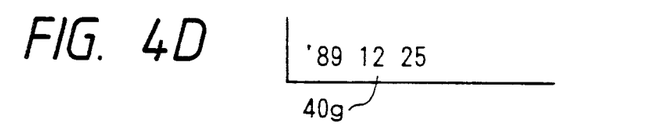
Figure 4E:
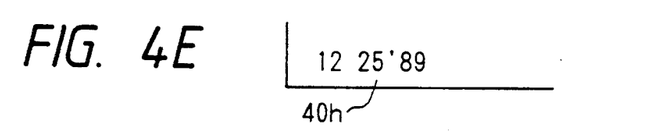
Figure 4F:
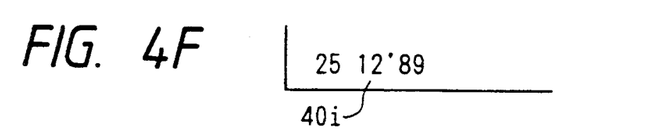
Figure 4G:
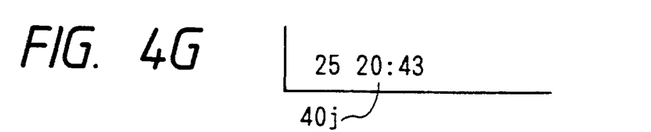

Each of FIGS. 4D to 4G indicates a result of a single imprint mode for only imprinting the first data in the first imprinting domain 31b. FIG. 4D indicates a year/-month/day data array 40g (single imprint mode in the year/month/day mode); FIG. 4E indicates a month-/day/year data array 40h (single imprint mode in the month/day/year mode); FIG. 4F indicates a day/-month/year data array 40i (single imprint mode in the day/month/year mode); and FIG. 4G indicates a day/- hour/minute data array 40*j* (single imprint mode in the day/hour/minute mode).

Figure 5:
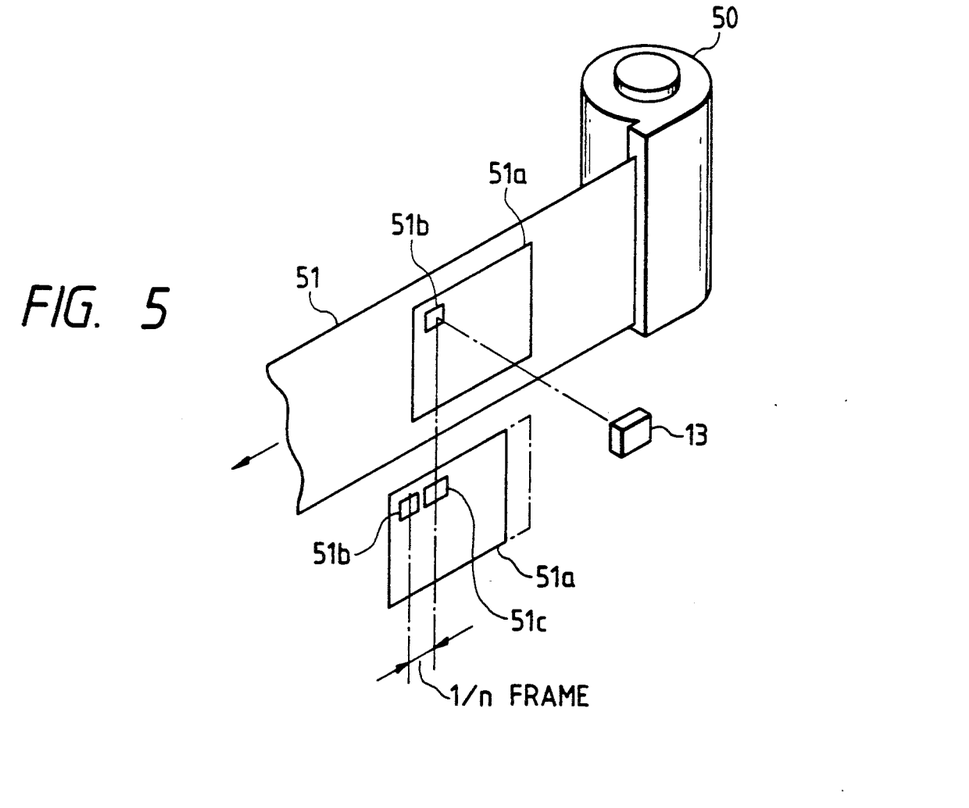
FIG. 5 is a perspective view indicating a case where the embodiment is employed on a camera loaded with a cartridge having film fed in the reverse direction.

FIG. 5 indicates a data imprinting procedure on a camera when a film cartridge 50 is loaded for film feeding in the reverse direction, that is, viewed from behind the camera, a cartridge is disposed on the right side, and a film spool is disposed on the left side, thus a film 51 being wound from right to left. The imprinter 13 is disposed on a back cover of the camera, and is opposite to a first imprinting domain 51*b* of the upper left corner of an exposure frame 51*a* brought to an exposure position. In the single imprint mode, winding of the film 51 is started immediately after the second data (hour/minute data) is imprinted in the first imprinting domain 51*b*, and the next frame is brought to an exposure position. In the two times imprint mode, after the second data is imprinted in the first imprinting domain 51*b*, the film is wound by 1/n frames (⅛ frames, for example) only, as indicated below the film 51, and the first data (any one of year/month/day data, month/day/year data, and day/month/year data) is imprinted in a second imprinting domain 51*c* positioned on the right side of the first imprinting domain 51*b* by the second imprinting.

Figure 6A:
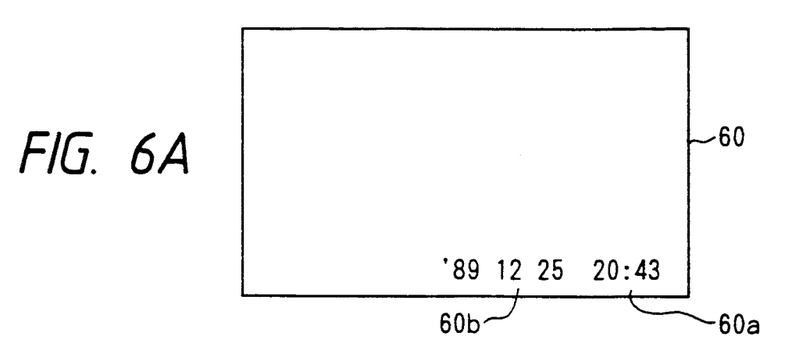
FIGS. 6A to 6G are illustrations showing a result of each data imprinting when film is fed in the reverse direction.
Figure 6B:
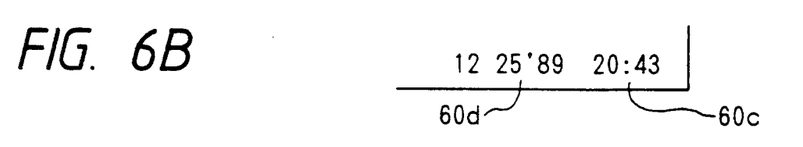
Figure 6C:
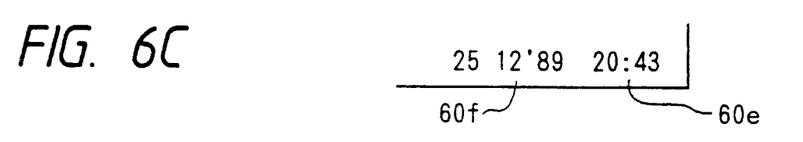

Prints obtainable from imprinting data with the cartridge loaded for film feeding in the reverse direction, as in FIG. 5, are shown in FIGS. 6A to 6G. FIGS. 6A to 6C indicates a print result when various two times imprint modes are selected. The second data imprinted in the first imprinting domain 51*b* of FIG. 5 is an hour/minute data array 60*a* present on the lower right corner of a print 60 of FIG. 6A. The data imprinted in the second imprinting domain 51*c* of FIG. 5 is a year/month/day data array 60*b* on the left side of the hour/minute data array 60*a*. That is, FIG. 6A indicates a result of the two times imprint mode (two times imprint mode in the year/month/day mode or two times imprint mode in the day/hour/minute mode) for imprinting the hour/minute data array and the year/month/day data array successively FIG. 6B indicates a result of the two times imprint mode (two times imprint mode in the month/day/year mode) for imprinting an hour/minute data array 60*c* and a month/day/year data array 60*d* successively, and FIG. 6C indicates a result of the two times imprint mode (two times imprint mode in the day/month/year mode) for imprinting an hour/minute data array 60*e* and a day/month/year data array 60*f* successively. Thus when the cartridge is loaded for film feeding in the reverse direction, the hour/minute data array is imprinted by the first imprinting in all the two times imprint modes.

Figure 6D:
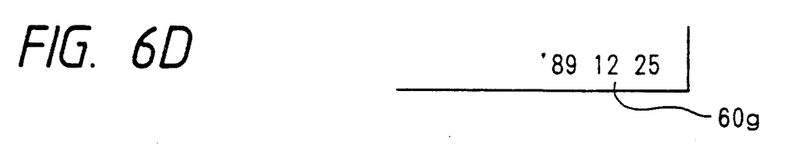
Figure 6E:
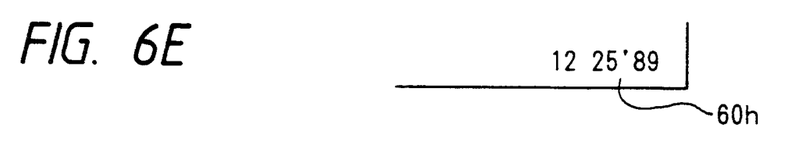
Figure 6F:
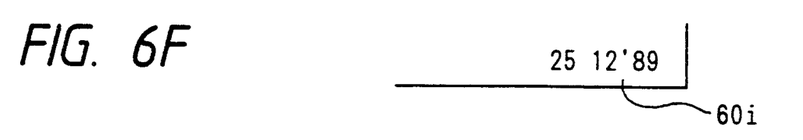
Figure 6G:
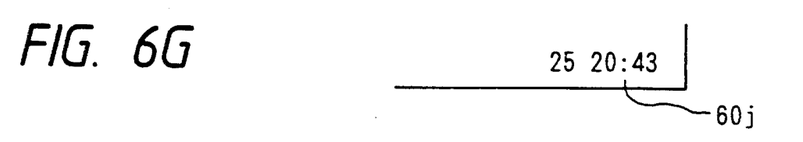

FIGS. 6D to 6G indicate a result in each single imprint mode for carrying out imprinting in the first imprinting domain 51*b* of FIG. 5 one time only. FIG. 6D indicates a year/month/day data array 6*g* (single imprint mode in the year/month/day mode). FIG. 6E indicates a month/day/year data array 60*h* (single imprint mode in the month/day/year mode) FIG. 6F indicates a day/month/year data array 60*i* (single imprint mode in the day/month/year mode); and FIG. 6G indicates a day/hour/minute data array 60*j* (single imprint mode in the day/hour/minute mode).

FIG. 7 to FIG. 18 are flowcharts for illustrating operation of the present embodiment controlled by the control circuit 1 of FIG. 1.

Figure 7:
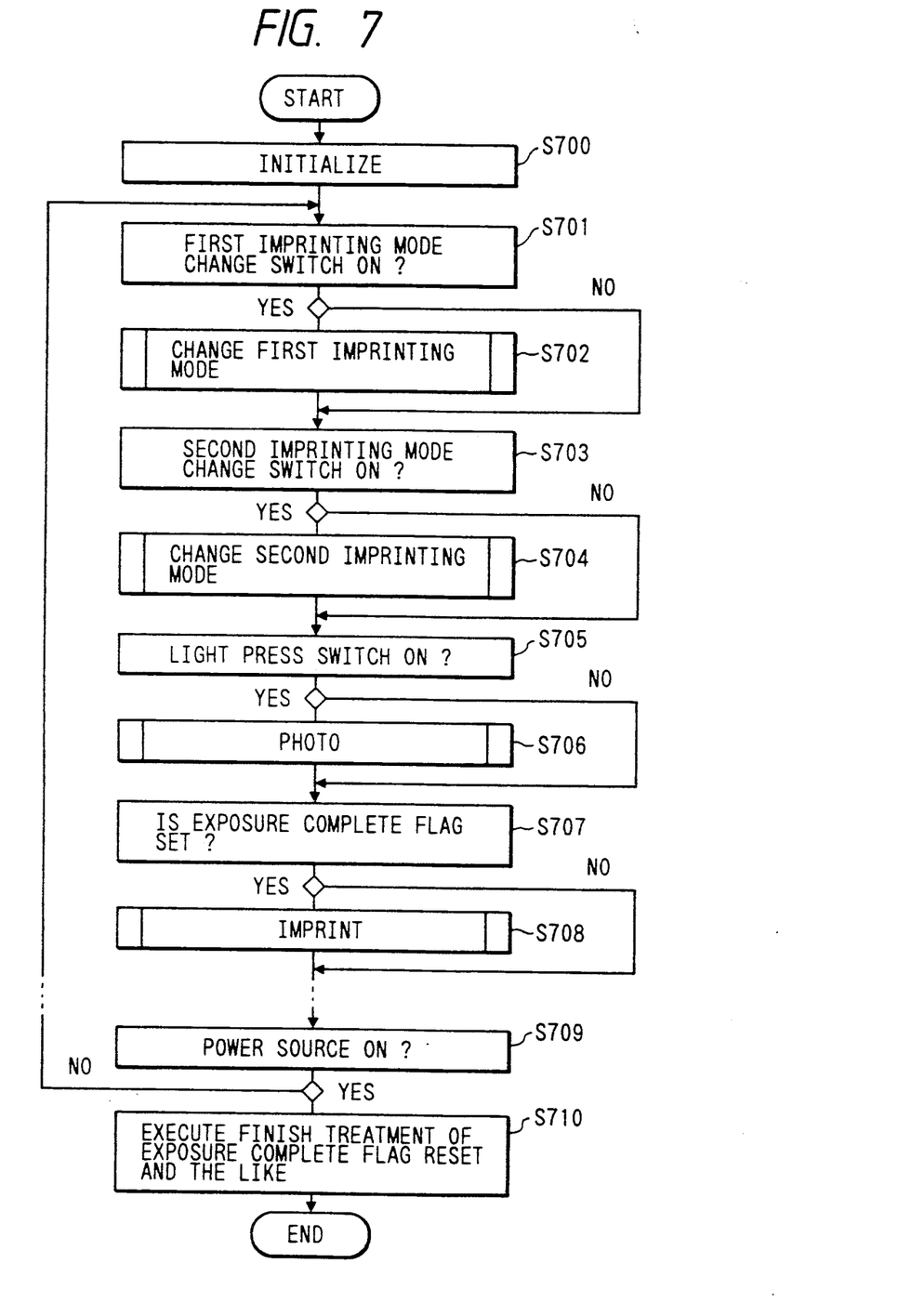
FIG. 7 is a main flowchart indicating an operation of the embodiment.

FIG. 7 indicates a main routine (process) started by turning the power source switch 2 to ON position.

In the first step S700, an initialization necessary immediately after a power supply is started is performed.

In the next step S701, whether or not the first imprinting mode change switch 6 is on is decided. If the first imprinting mode change switch 6 is kept on, a subroutine for changing the first imprinting mode, step S702, is executed, but if off, the process proceeds to a step S703.

In the step S703, whether or not the second imprinting mode change switch 7 is on is decided. If the second imprinting mode change switch 7 is kept on, a subroutine for changing the second imprint mode, step S704, is executed, but if off, the process proceeds to a step S705.

In the step S705, whether or not the light press switch 3 is on is decided. If the light press switch 3 is kept on, a subroutine for photo process, step S706, is executed, but if off, the process proceeds to a step S707.

In the step S707, whether or not an exposure complete flag indicating a completion of exposure is set is decided, and if set, a subroutine for imprinting process, step S708, is executed, but if not, then the process proceeds to a step S709.

In the step S709, whether or not the power source switch 2 is turned to OFF position is decided. If it is kept at OFF position, the process proceeds to a step S710, where various finishing processes necessary before stopping a power supply, such as resetting the exposure complete flag and the like, are executed, and the process is finished thereafter. In the step S709 if it is decided that the power source switch 2 is kept on, the process returns to the step S701 to repeat the above-described procedure.

In a practical camera, a process incidental to an opening of the back cover or a process carried out when a power source is consumed, for example, will be necessary in addition to the processes described in the main routine of FIG. 7; however, these are not essential to the present invention, and hence are omitted here.

Figure 8:
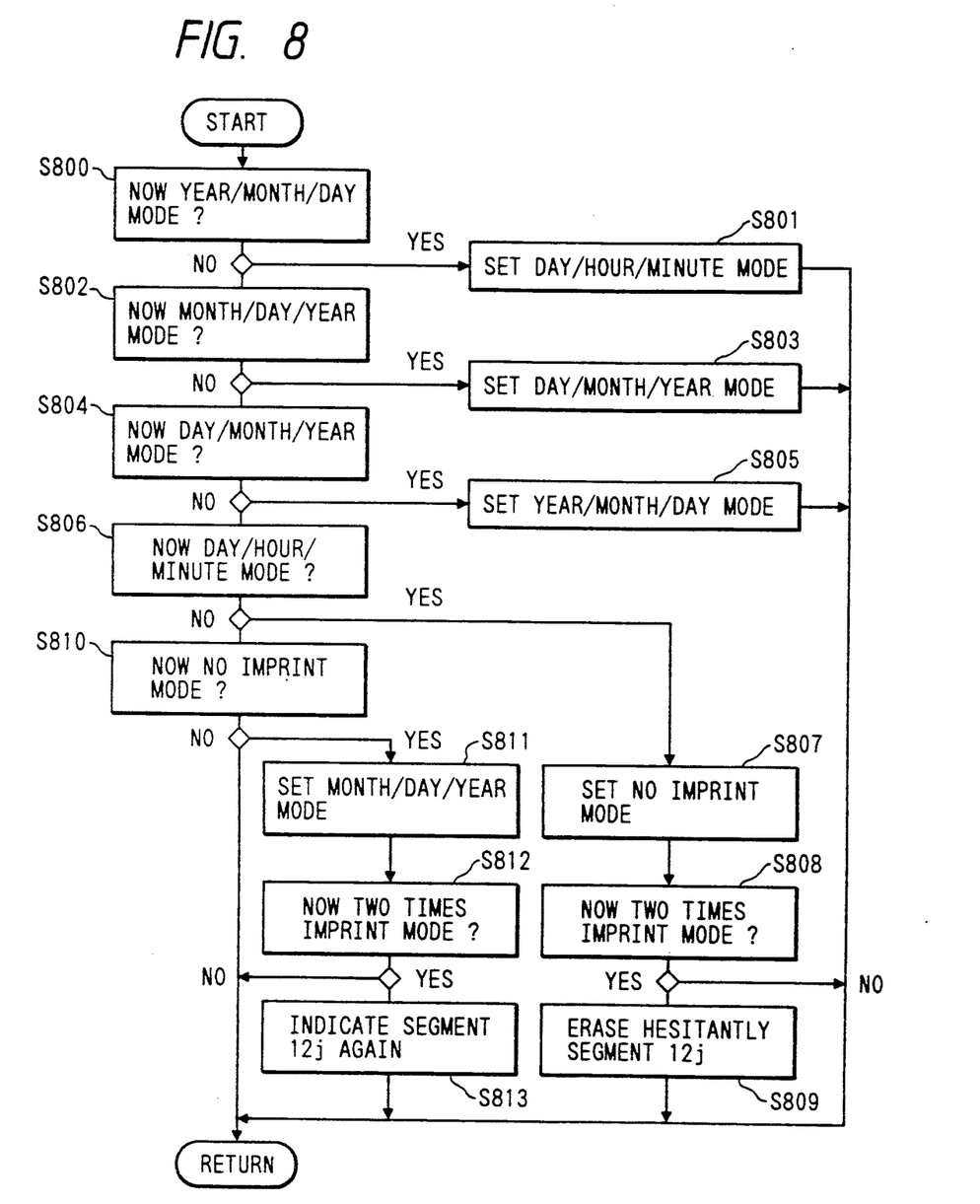
FIG. 8 is a flowchart indicating a first imprint mode changing process of FIG. 7.

FIG. 8 indicates a process for changing the first imprint mode, step S702, which is executed if the first imprinting mode change switch 6 is turned on.

In the first step S800, whether or not a year/month/day mode is set now is decided, and if set, the process proceeds to a step S801, but if not, then it proceeds to a step S802.

In the step S801, a change to a day/hour/minute mode is set to return. According to the change set, the seven segments 12*a* to 12*f* of the external display 12 of FIG. 2 and the segment 12*g* are kept displaying (as "25 20:43", for example) and thus display that the day/hour/minute mode has been set. Further, the imprinter 13 is also kept displaying as corresponding to the external display 12, but the illumination light source does not light up. Needless to say, data displayed thereby is updated by an output of the electronic clock 8 as time passes.

In the step S802, whether or not a month/day/year mode is set is decided, and if set, the process proceeds to a step S803, but if not, it proceeds to a step S804.

In the step S803, a change to a day/month/year mode is set to return. According to the change set, the seven segments 12*a* to 12*f* and the segments 12*i* 12*l* of the external display 12 of FIG. 2 are kept displaying (as "25 12 '89", for example, further "M" being displayed over "12"), thus displaying that the day/month/year mode has been set. Further, the imprinter 13 is also kept displaying, except the segment 12*l*, as corresponding to the external display 12.

In the step S804, whether or not a day/month/year mode is set now is decided, and if set, the process proceeds to a step S805, but if not, it proceeds to a step S806.

In the step S805, a change to a year/month/day mode is set to return. According to the change set, the seven segments 12a to 12f, and the segments 12h, 12l of the external display 12 of FIG. 2 are kept displaying (as "'89 12 25", for example, further "M" being displayed over "12"), thus displaying that the year/month/day mode has been set. Further, the imprinter 13 is also kept displaying, except the segment 12l, as corresponding to the external display 12.

In the step S806, whether or not a day/hour/minute mode is set now is decided, and if set, the process proceeds to a step S807.

In the step S807, a change to a no imprint mode is set. Accordingly, the seven segments 12a to 12f of the external display 12 of FIG. 2 are displayed as "— — —", for example, thus displaying that the no imprint mode has been set. However, the imprinter 13 is kept displaying nothing on all segments.

Whenever the step S807 is over, the process proceeds to a step S808, at which whether or not two times imprint mode is set now is decided, and if set, a step S809 is executed to return, but if not, then the process returns as it stands.

In the step S809, the segment 12j of the external display 12 indicating that the two times imprint mode has been set now is turned to an erase state from the display state. The erasing is carried out so long as no imprint mode is set. Thus, a display on the seven segments 12a to 12f ("— — —", for example) indicating that a data imprinting is not performed and a display on the segment 12j indicating that a data imprinting is performed are both effected, thereby preventing users from being confused.

In the step S806 if it is decided that the day/hour/minute mode has not been set now, then the process proceeds to a step S810.

In the step S810 whether or not a no imprint mode is set is decided, and if set, the process proceeds to a step S811, but if not set, it returns as it stands. In the step S811, a change to a month/day/year mode is set. According to the change set, the seven segments 12a to 12f and the segments 12i, 12k of the external display 12 of FIG. 2 are kept displaying (as "12 25 '89", for example, further "M" being displayed over "12"), thus displaying that the month/day/year mode has been set. Further the imprinter 13 is also kept displaying, except the segment 12k, as corresponding to the external display 12. When the step S811 is over, the process proceeds to a step S812, whether or not a two times imprint mode is set now is decided, and if set, a step S813 is executed to return, but if not set, then the process returns as it stands.

In the step S813, the segment 12j of the external display 12 indicating that the two times imprint mode has been set is returned to a display state from an erase state.

Figure 9:
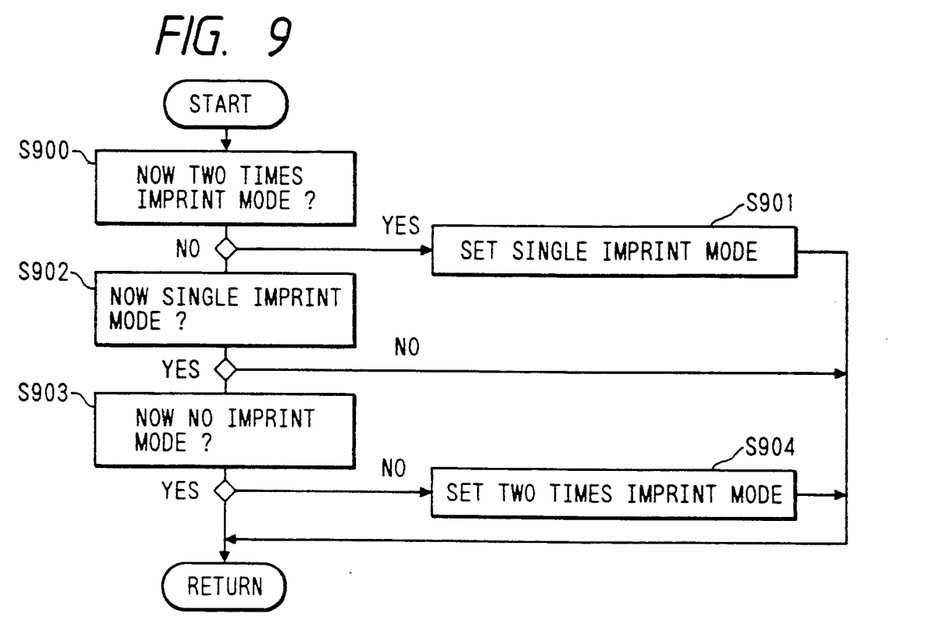
FIG. 9 is a flowchart indicating a second imprint mode changing process of FIG. 7.

FIG. 9 indicates a process for changing the second imprint mode of the step S704 executed when the second imprinting mode change switch 7 is turned on.

In the first step S900, whether or not a two times imprint mode is set now is decided, and if set, a step S901 is executed, but if not set, then a step S902 is executed.

In the step S901, the process returns after a change to a single imprint mode is set. According to the change set, the segment 12j of the external display 12 which was kept displaying at the time of two times imprint mode becomes a no-display state, thus indicating that the single imprint mode has been set.

In step S902, whether or not a single imprint mode is set now is decided, and if set, a step S903 is executed, but if not, the process returns.

In the step S903, whether or not a no imprint mode is set now is decided, and if set, the process returns as it stands, but if not set, then it proceeds to a step S904. Thus the two times imprint mode is prohibited from being set at the time of no imprint mode.

In the step S904, a two times imprint mode is set, and the segment 12j of the external display 12 is kept indicating, thereby indicating that the two times imprint mode has been set.

Figure 10:
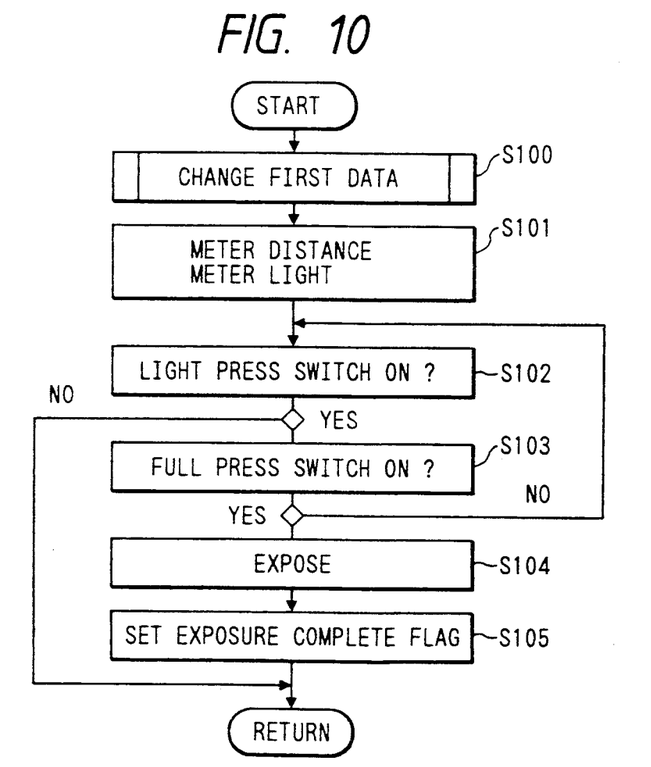
FIG. 10 is a flowchart indicating a photographing process of FIG. 7.

FIG. 10 indicates a photographing process of the step S706 executed when the light press switch 3 is turned on.

The first step S100 is a process for changing the first data displayed by the external display 12 and the imprinter 13 as occasion demands. The operation, varying with the cases where the cartridge is loaded for film feeding in the forward direction or the reverse direction, will be described in detail later.

When a subroutine of the step S100 is completed, a range finding operation and a photometric operation are carried out on the autofocus adjuster 9 and the auto exposer controller 10, respectively, in the next step S101.

In the next step S102, whether or not the light press switch 3 is on is decided, and if on, the process proceeds to a step S103, but if off, it then returns.

In the step S103, whether or not the full press switch 4 is on is decided, and if on, the process proceeds to a step S104, but if off, it returns to the step S102.

In the step S104, after a camera lens is driven by the autofocus adjuster 9, a diaphragm and a shutter are controlled by the auto exposure controller 10, thus exposing the film.

If film is exposed in the step S104, an exposure complete flag is set in the next step S105, and the process then returns.

Of the first data changing process of the step S100, the case where the cartridge is loaded in the forward direction will be described first. In this case, a process of the step S100 is as shown in FIG. 11.

Figure 11:
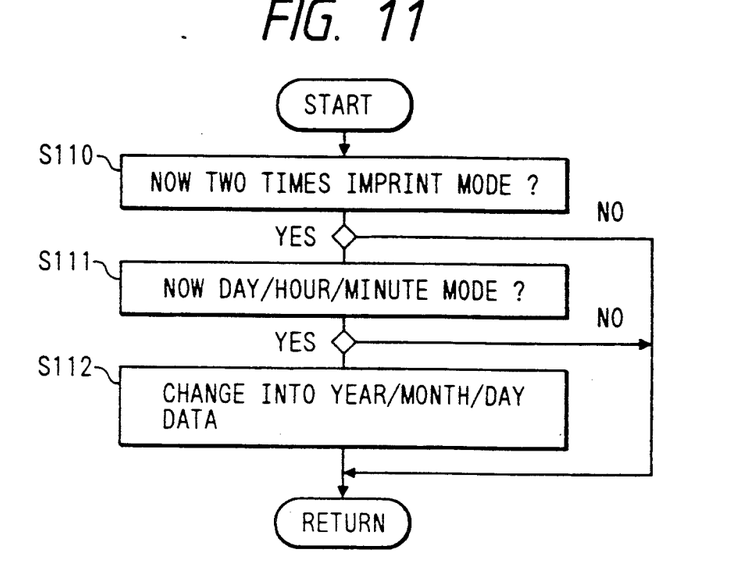
FIG. 11 is a flowchart indicating a first data changing process (film fed in the forward direction) of FIG. 10.

In FIG. 11, whether or not a two times imprint mode is set now is decided in the first step S110, and if set, the process proceeds to a step S111, but if not, it returns, as a data change is not required.

In the step S111, whether or not a day/hour/minute mode is set is decided, and if set, the process proceeds to a step S112, but if not, it returns, as a data change is not required.

In step S112, the day/hour/minute data (for example, "25 20:43" indicating 25th day 20 hours 43 minutes) displayed on the segments of the external display 12 and the imprinter 13 for indicating that a day/hour/minute mode has been set so far is changed into year/month/day data (for example, "'89 12 25" indicating Dec. 25, 1989) to be imprinted first at the time of loading with film feeding in the forward direction. Needless to say, this year/month/day data changes as time passes, based on an output of the electronic clock 8.

When the day/hour/minute mode and the two times imprint mode are both set, the data imprinted first is a year/month/day data which is different from the day/- hour/minute data displayed so far; therefore the process carried out in FIG. 11 comprises, in short, carrying out a display change into the year/month/day data as the light press switch 3 is turned on. Thus, it can be known that at the time when the day/hour/minute mode and the two times imprint mode are set, the year/month/-day data is imprinted first at the point in time when the light press switch 3 is turned on.

Further, the time required for display change of liquid crystal display elements used on the external display 12 and the imprinter 13 will be long in the cold season; however, this may be overcome by quickening the display change at the point in time when the light press switch 3 is turned on.

Figure 12:
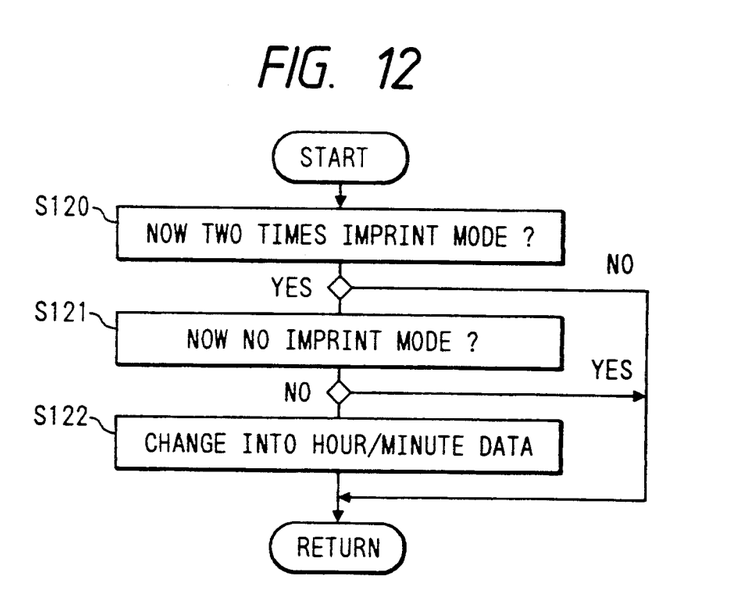
FIG. 12 is a flowchart indicating the first data changing process (film fed in the reverse direction) of FIG. 10.

In case, on the other hand, the cartridge is loaded for film feeding in the reverse direction, the process for changing the first data in the step S100 is carried out as in FIG. 12.

In FIG. 12, whether or not a two times imprint mode is set now is decided in the first step S120, and if set, the process proceeds to a step S121, but if not, it then returns, as a data change is not required.

In the step S121, whether or not a no imprint mode is set now is decided, and if set, the process returns, as a data change is not required, but if not set, it proceeds to a step S122.

In the step S122, each data displayed on the segments of the external display 12 and the imprinter 13 for indicating that each imprint mode (year/month/day mode, day/hour/minute mode, month/day/year mode, day/-month/year mode) has been set so far is changed into an hour/minute data imprinted first at the time of loading for film feeding in the reverse direction. Needless to say, the hour/minute data also changes as time passes based on an output of the electronic clock 8.

When the no imprint mode is not set, and the two times imprint mode has been set, since the data imprinted first is hour/minute data which is different from the data displayed so far, the process carried out in FIG. 12 comprises, in short, carrying out a display change to the hour/minute data as the light press switch 3 is turned on. Thus, it can be known that the hour/minute data is imprinted first at the time when the two times imprint mode is set on the reverse-loaded camera at the point in time when the light pres switch 3 is turned on. Then, the display change is quickened at the point in time when the light press switch 3 is turned on, thereby coping with the cold season.

Figures 13, 13A:
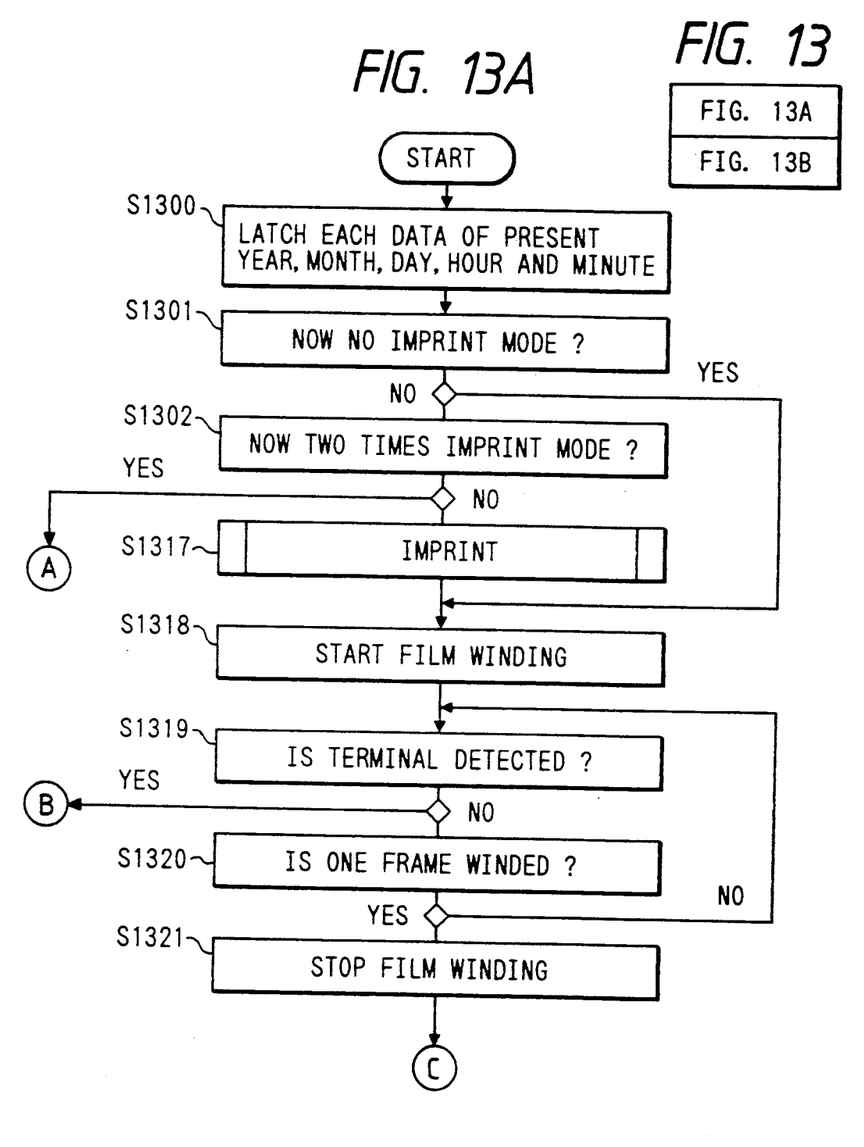
FIGS. 13, 13A and 13B are a flowchart indicating an imprinting process of FIG. 7.
Figure 13B:
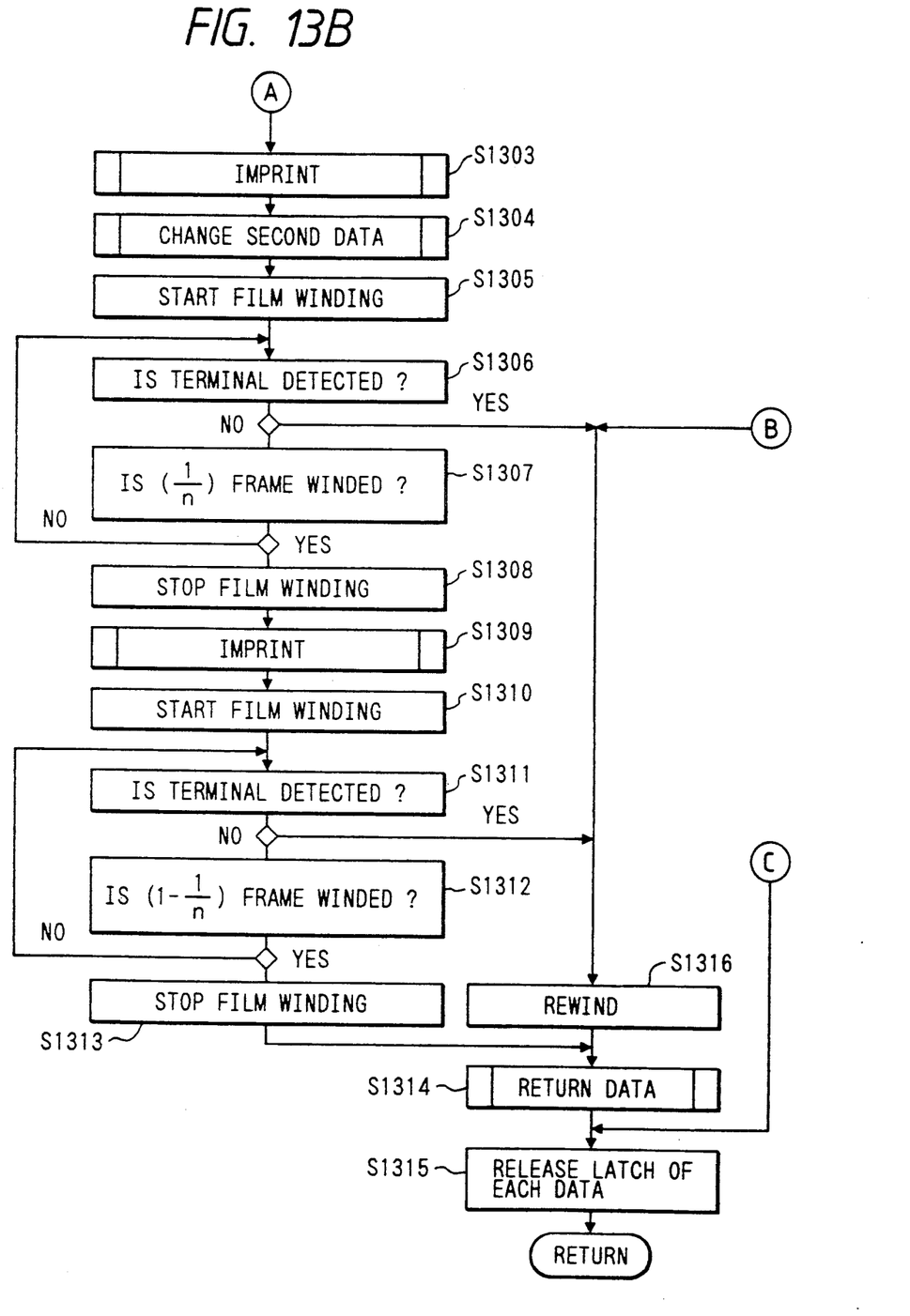

FIG. 13 indicates a process of the imprinting process of the step S708, and the process is carried out after exposure is completed, that is, after returning to the step S707 of FIG. 7 upon ending the photographing process in the state where the exposure complete flag is set.

In FIG. 13, each data of year, month, day, hour and minute outputted by the electronic clock 8 is latched within the control circuit 1 in a step S1300. Accordingly, data displayed by the external display 12 and the imprinter 13 will not change despite the lapse of time. The electronic clock 8 will never stop time-keeping during the period of time. Thus an imprinting of each data at the point in time of exposure is ensured, and an imprinted image is prevented from being unclear as a result of data changing during imprinting.

In the next step S1301, whether or not a no imprint mode is set now is decided, and if not, the process proceeds to a step S1302, and if so set, then it proceeds to a step S1318.

In the step S1302, whether or not a two times imprint mode is set now is decided, and if so, the process proceeds to a step S1303, but if not, it proceeds to a step S1317.

In the step S1303, an illumination light source of the imprinter 13 emits light, thereby carrying out a first imprinting in the two times imprint mode.

Data imprinted first at the time of two times imprint mode on a forward-loaded camera are as follows:

(a) Year/month/day mode or day/hour/minute mode Year/month/day data (40a of FIG. 4A)

(b) Month/day/year mode Month/day/year data (40c of FIG. 4B)

(c) Day/month/year mode
Day/month/year data (40e of FIG. 4C)

On the other hand, data imprinted first at the time of two times imprint mode on a reverse-loaded camera are as follows:

(a) Year/month/day mode or day/hour/minute mode Hour/minute data (60a of FIG. 6A)

(b) Month/day/year mode Hour/minute data (60c of FIG. 6B)

(c) Day/month/year mode Hour/minute data (60e of FIG. 6C)

When the step S1303 is completed, a step S1304 is carried out next. In the step S1304, a second data changing process for changing data imprinted second is carried out. Contents of the process vary with the cases where a camera is loaded for film feeding in the forward direction and in the reverse direction.

Figure 14:
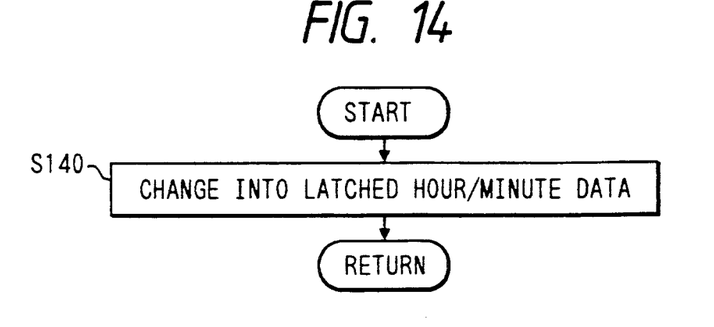
FIG. 14 is a flowchart indicating a second data changing process (film fed in the forward direction) of FIG. 13.

In case the cartridge is loaded for film feeding in the forward direction, the step S1304 comprises a process shown in FIG. 14.

A step S140 of FIG. 14 comprises changing the data displayed so far by the external display 12 and the imprinter 13 into an hour/minute data latched in the step S1300. The process returns upon completion.

Figure 15:
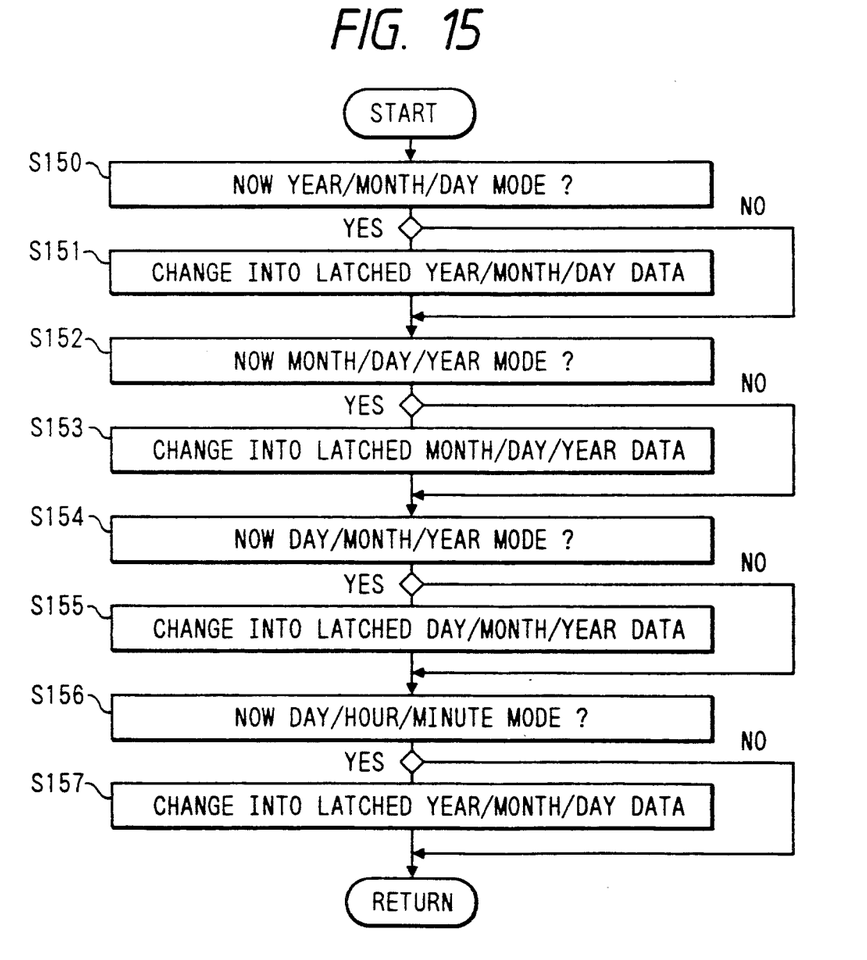
FIG. 15 is a flowchart indicating the second data changing process (film fed in the reverse direction) of FIG. 13.

In case the cartridge is loaded for film feeding in the reverse direction, the step S1304 comprises a process shown in FIG. 15.

In FIG. 15, whether or not a year/month/day mode is set now is decided in the first step S150, and if set, the process proceeds to a step S151, but if not, then it proceeds to a step S152.

In the step S151, the hour/minute data displayed on the segments of the external display 12 and the imprinter 13 is changed into a year/month/day data imprinted second. The year/month/day data is data latched in the step S1300.

In the step S152, whether or not a month/day/year mode is set now is decided, and if set, the process proceeds to a step S153, but if not, it proceeds to a step S154.

In the step S153, the hour/minute data displayed on the segments of the external display 12 and the imprinter 13 so far is changed into month/day/year data imprinted second. The month/day/year data is also data latched in the step S1300.

In the step S154, whether or not a day/month/year mode is set now is decided, and if set, the process proceeds to a step S155, but if not, it proceeds to a step S156.

In the step S155, the hour/minute data displayed so far on the segments of the external display 12 and the imprinter 13 is changed into day/month/year data imprinted second. The day/month/year data is also data latched in the step S1300.

In the step S156, whether or not a day/hour/minute mode is set now is decided, and if set, the process proceeds to a step S157, but if not, it then returns.

In step S157, the process returns after the hour/minute data displayed on the segments of the external display 12 and the imprinter 13 is changed into year/month/day data imprinted second. The year/month/day data is also data latched in the step S1300.

Reverting to FIG. 13, when the step S1304 is completed, the process proceeds to the next step S1305, and film winding by the film winding device 11 is started. Then in a step S1306, whether or not a film has reached a terminal is decided, and if not, the process proceeds to a step S1307, and if so, it then proceeds to a step S1316.

In the step S1307, whether or not winding from the start point in the step S1305 has reached 1/n frames (⅛ frames, for example) is decided, and if not, the process returns to the step S1306, and if so, then the winding is stopped once in a step S1308.

After the winding is stopped in the step S1308, the process proceeds to a step S1309, and an illumination light source of the imprinter 13 emits light again, thus carrying out a second imprinting in the two times imprint mode.

Data imprinted second at the time of two times imprint mode on a forward-loaded camera are as follows:

(a) Year/month/day mode or day/hour minute mode Hour/minute data (40b of FIG. 4A)

(b) Month/day/year mode Hour/minute data (40d of FIG. 4B)

(c) Day/month/year mode Hour/minute data (40f of FIG. 4C)

On the other hand, data imprinted second at the time of two times imprint mode on a reverse-loaded camera are as follows:

(a) Year/month/day mode or day/hour/minute mode Year/month/day data (60b of FIG. 6A)

(b) Month/day/year mode Month/day/year data (60d of FIG. 6B)

(c) Day/month/year mode Day/month/year data (60f of FIG. 6C)

When the step S1309 of FIG. 13 is over, film winding is recommenced in a step S1310. Then, whether or not a film reaches the terminal is decided in a step S1311, and if not, the process proceeds to a step S1312, and if so, then it proceeds to a step S1316.

In the step S1312, whether or not winding from the start point in the step S1310 has reached 1−(1/n) frames (⅞ frames, for example) is decided, and if not, the process returns to the step S1311, and if so, then the winding is stopped in a step S1313, and the process proceeds to a step S1314.

Figure 16:
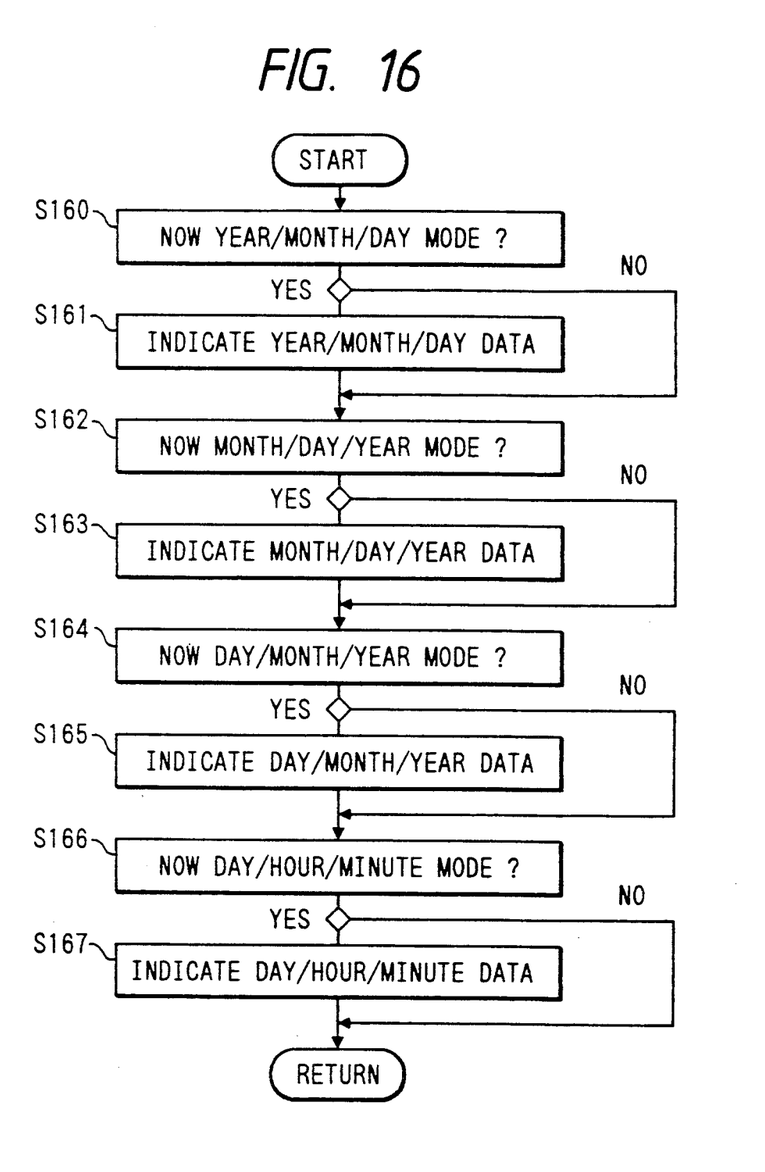
FIG. 16 is a flowchart indicating a data return process of FIG. 13.

In the step S1314, the data displayed by the external display 12 and the imprinter 13 is returned to an original state, namely a state before the photographing process of step S706 of FIG. 7 is executed. Steps S160 to S167 of FIG. 16 show the process therefor. A mode of display by both the devices 12, 13 in each imprint mode after return is as described with reference to FIG. 8. Year/month/day data and others are displayed for the year/month/day mode (steps S160, S161); month/day/year data and others are displayed for the month/day/year mode (steps S162, S163); day/month/year data and others are displayed for the day/month/year mode (steps S164, S165); and day/hour/minute data and others are displayed for the day/hour/minute mode (steps S166, S167).

In the next step S1315, a latch effected on each data of year, month, day, hour and minute in the step S1300 is released, present data provided from the electronic clock 8 is displayed on the external display 12 and the imprinter 13, and the process then returns.

When the terminal is detected in the steps S1306, S1311, the process proceeds to a step S1316 to rewind a film on the film winding device 11, and then the process proceeds to the step S1314.

If a decision is made that the mode working now is not a two times imprint mode in the step S1302, the process proceeds to the step S1317, where data is imprinted in a single imprint mode. That is, year/month/day data and others are imprinted for the year/month/day mode (40g of FIG. 4D when loaded forward; 60g of FIG. 6D when loaded reversely), month/day/year data and others are imprinted for the month/day/year mode (40h of FIG. 4E when loaded forward; 60h of FIG. 6E when loaded reversely), day/month/year data and others are imprinted for the day/month/year mode (40i of FIG. 4F when loaded forward; 60i of FIG. 6F when loaded reversely), and day/hour/minute data and others are imprinted for the day/hour/minute mode (40j of FIG. 4G when loaded forward; 60j of FIG. 6G when loaded reversely).

Film winding is started in the step S1318 thereafter, and the winding is continued until the terminal is detected in a step S1319, or winding for one frame is detected in a step S1320. When the terminal is detected in the step S1319, the process proceeds to the aforementioned step S1316 to perform rewinding, and when winding for one frame is detected in a step S1320, the winding is stopped in a step S1321, the process proceeds to the aforementioned step S1315 to execute it, and then the process returns.

In the above-described embodiment, hour/minute data is indicated as the second data; however, hour/minute/second data may be imprinted otherwise. In this case, which data, hour/minute data or hour/minute/second data, to imprint or not to imprint, may be selected cyclically on the second imprinting mode change switch.

The imprinting of FIG. 13 is carried out after exposure is completed; however, the present invention is not necessarily limited thereto, and imprinting may be carried out, for example, immediately before exposure is started or during exposure.

Further, each of the above-described embodiments comprises imprinting the first data including year, month, day and the second data including hour, minute in two times separately; however, the present invention is not necessarily limited thereto, and thus the first data coming in an alphabetical character string (such as, for example, "HAPPY BIRTHDAY", "I LOVE YOU", "CONGRATULATION"), and the second data coming in symbols (such as, for example, "!", " ") may be imprinted successively, or a numeral string, character string and symbols may be combined properly for imprinting successively. For example, "HAPPY BIRTHDAY" and "I LOVE YOU" may be imprinted successively, or "HAPPY BIRTHDAY" and "!" may be imprinted successively, and further, "HAPPY BIRTHDAY" and "'89 12 25" may also be imprinted successively.

Data imprinted successively are not limited to two kinds, and hence may be three kinds or more. In such case, the number of times for interrupting a feed of film for a while for imprinting data second on may be increased by the number of kinds of data to be imprinted second on. For example, in case four data such as "HAPPY BIRTHDAY" "!", "'89 12 25" and "20 -- 43" are imprinted successively to the same frame, the feed of film will be interrupted three times.

Further, data may be disposed outside of an exposure window instead of being disposed inside of the imprinter and the exposure window.

Still further, the imprinter may be constructed not to imprint data for plural digits collectively but to imprint data successively as winding of the film occurs.

As described above, according to the present invention, two imprint mode changing means are provided. One is provided with a function to select a first data imprint mode for imprinting first data (any one of year/month/day data, month/day/year data and day/month/year data, for example), and a first no imprint mode for not imprinting the first data, and the other is provided with a function to select a second data imprint mode for imprinting second data (hour/minute data, for example) in addition to the first data, and a second no imprint mode for not imprinting the second data. Therefore, the first data and the second data can be selected quickly as desired.

Further, the construction is such that by selecting the first no imprint mode on the first imprint mode changing means, the second no imprint mode is obtainable automatically without operating the second imprint mode changing means. Therefore, both the no imprint modes can be set simply by operating the first imprint mode changing means.

I claim:

1. An electric camera, comprising:
   imprinting means disposed opposite to a film and capable of imprinting plural digit data to an exposure frame of the film;
   first imprint mode changing means operated for selecting a first imprint mode for imprinting first data to said exposure frame, and a first no imprint mode for not imprinting the first data;
   second imprint mode changing means operated for selecting a second imprint mode for imprinting second data to said exposure frame together with said first data, and a second no imprint mode for not imprinting the second data; and
   control means for automatically effecting said second no imprint mode without an operation of said second imprint mode changing means, when the first no imprint mode is selected by said first imprint mode changing means.

2. An electric camera according to claim 1, wherein the first imprint mode selected by said first imprint mode changing means includes year, month, and day data in different orders selectable by successive operations of said first imprinting mode changing means, and wherein said second data selected by said second imprint mode changing means includes hour and minute data.

3. An electric camera, comprising:
   imprinting means disposed opposite to a film and capable of imprinting plural digit data to an exposure frame of the film;
   first imprint mode changing means operated for selecting a first imprint mode for imprinting first data to said exposure frame, and a first no imprint mode for not imprinting the first data;
   second imprint mode changing means operated for selecting a second imprint mode for imprinting second data to said exposure frame together with said first data, and a second no imprint mode for not imprinting the second data;
   display means for displaying said first data;
   switch means; and
   control means responsive to said switch means for inhibiting said display means from displaying said first data and causing said display means to display said second data when said second imprint mode is selected.

4. An electric camera according to claim 3, wherein the first imprint mode selected by said first imprint mode changing means includes year, month, and day data in different orders selectable by successive operations of said first imprinting mode changing means, and wherein said second data selected by said second imprint mode changing means includes hour and minute data.

5. An electric camera, comprising:
   an operating member;
   first imprinting means operated for imprinting first information to a film;
   second imprinting means operated for imprinting second information to a film; and
   means for preventing said second imprinting means from imprinting said second information to the film when said first imprinting means is not operated for imprinting said first information to the film, said second imprinting means being capable of imprinting said second information only when said first imprinting means is operated to imprint said first information to the film.

6. An electric camera according to claim 5, wherein said first imprinting means has different operating modes for imprinting first information including year, month, and day information in different orders and has a non-imprinting mode, and wherein said second imprinting means has an operating mode for imprinting second information including hour and month information, and has a non-imprinting mode, and wherein said non-imprinting mode of said second imprinting means is effected automatically when said non-imprinting mode of said first imprinting means is effected.

* * * * *